(No Model.) 2 Sheets—Sheet 2.

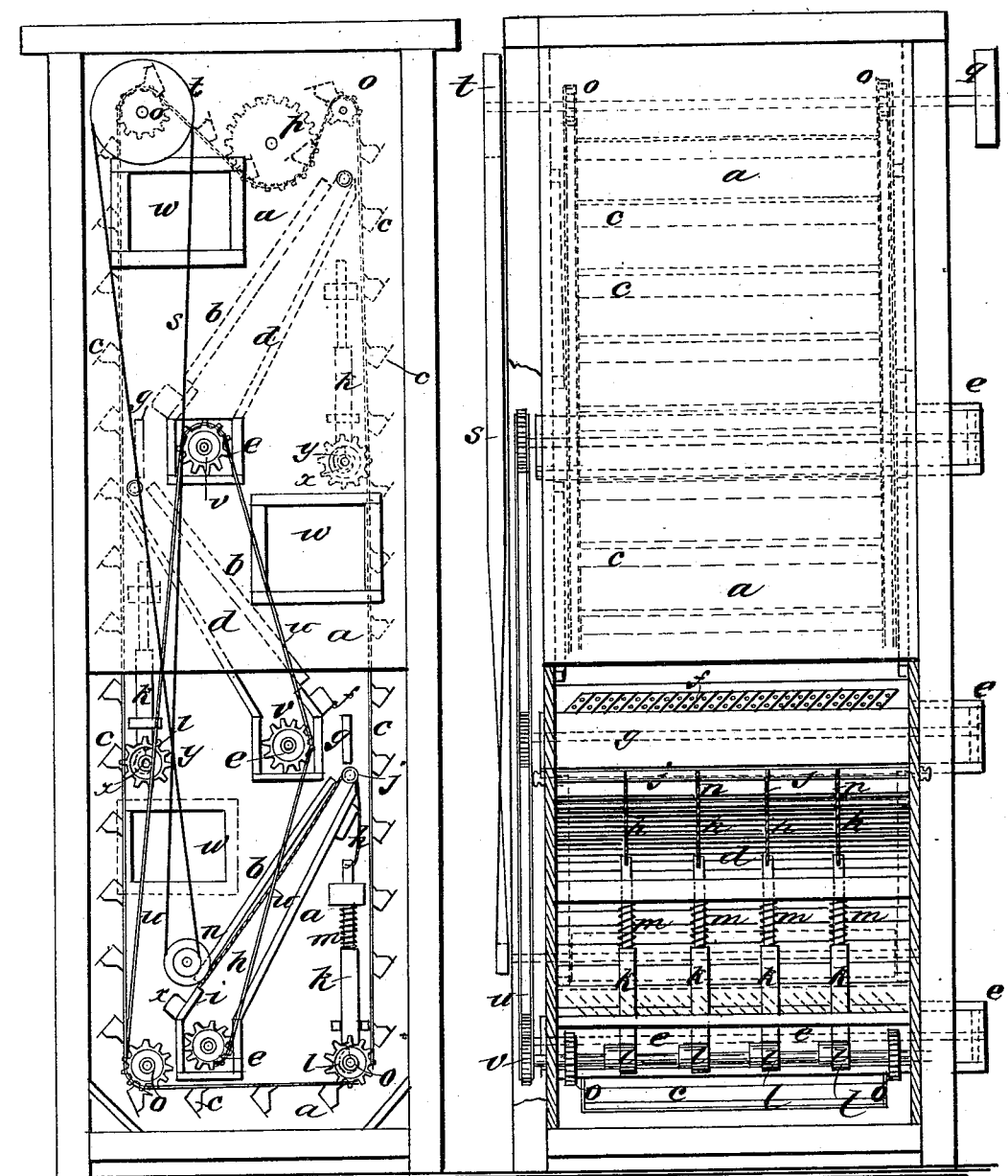

J. DAMP.
MACHINE FOR SEPARATING GRAIN, MEAL, &c.

No. 282,707. Patented Aug. 7, 1883.

Witnesses:
Geo. E. Pitman,
Theo. L. Popp.

John Damp, Inventor.
By Wilhelm Bonner
Attorneys.

UNITED STATES PATENT OFFICE.

JOHN DAMP, OF ASHLAND, OHIO.

MACHINE FOR SEPARATING GRAIN, MEAL, &c.

SPECIFICATION forming part of Letters Patent No. 282,707, dated August 7, 1883.

Application filed February 15, 1883. (No model.)

*To all whom it may concern:*

Be it known that I, JOHN DAMP, of Ashland, in the county of Ashland and State of Ohio, have invented new and useful Improvements in a Machine for Separating Grain, Meal, &c., of which the following is a specification.

This invention relates to an improvement in that class of separating-machines in which one or more inclined sieves are employed in connection with elevating mechanism, whereby the coarse material which has passed over the sieve is elevated and delivered upon the head of the sieve, and in which the material is at the same time gradually moved across the sieve, so that the material in passing from the inlet to the outlet side of the machine is repeatedly elevated and caused to flow over the inclined sieve.

The object of my invention is the construction of a compact and efficient machine of this character which may be employed for separating flour from bran and impurities from grain, and for other similar purposes; and my invention consists of the improvements in the construction of the machine which will be hereinafter fully set forth, and pointed out in the claims.

Figure 3:
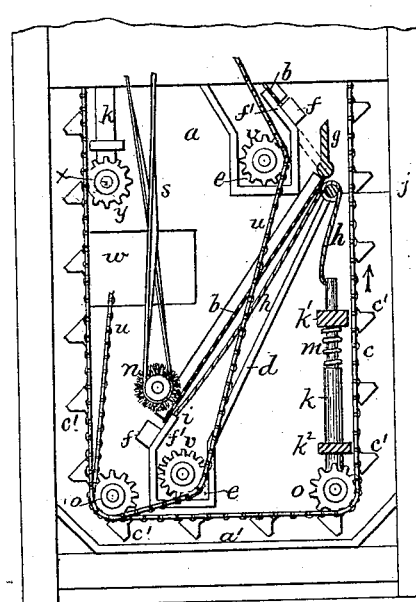
Figure 4:
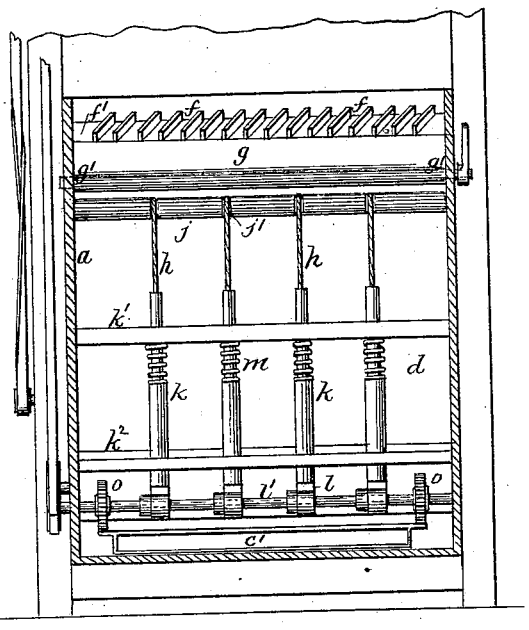
Figure 5:
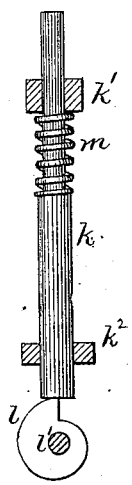

In the accompanying drawings, consisting of two sheets, Figure 1 is a side elevation of the machine with the lower part of the casing removed. Fig. 2 is an end elevation of the machine with the casing removed. Fig. 3 is a side elevation of the lower part of the machine with the side boards of the casing removed. Fig. 4 is an end elevation of the machine with the end board of the casing removed. Fig. 5 is a side elevation of the mechanism by which the whip-cords are actuated.

Like letters of reference refer to like parts in the several figures.

$a$ represents the upright chest or casing of the machine, composed of upright posts, horizontal cross-pieces, and suitable boards secured thereto, the whole forming a tight casing, in which the separating mechanism is inclosed.

$b$ represents one or more inclined sieves, covered with bolting or wire-cloth, and arranged in the casing $a$. When two or more sieves are employed, the sieves are inclined alternately in opposite directions, and arranged one above the other, as represented in the drawings, so that the tailings of one sieve are discharged upon the head of the sieve next below.

$d$ represents a gathering-board, arranged in an inclined position below each sieve, to receive the material which has been bolted through the same, and to conduct such material into the trough of a conveyor, $e$, arranged below each sieve, and whereby the bolted material is discharged out of the case.

$f$ represents inclined chutes or guide-boards, which are arranged below the tail end of each sieve and secured to a board, $f'$, forming a continuation of the sieve and extending to the top of the conveyor-trough. The chutes $f$ are inclined in each sieve in such a direction as to deflect the material toward the discharge side of the casing or machine, whereby the material is gradually moved from the receiving toward the discharge side of the casing.

$g$ represents a gate or valve arranged at the head of each sieve, except the first, and pivoted at its lower edge in the side walls of the casing, as shown at $g'$, so that the gate may be placed in an upright position, as represented in full lines in Figs. 1 and 3, when it is desired to conduct the tailings of the upper sieve to the head of the sieve next below, while the gate can be placed in an inclined position, with its upper end resting against the conveyor-box next above, as represented in dotted lines in Fig. 3, when it is desired to discharge the tailings of the upper sieve directly into the main casing without running them over the lower sieve or sieves.

$H$ represents the whip-cords, arranged below each sieve, for lightly whipping the cloth to dislodge any material which may adhere to the same. The cords $h$ are attached with their lower ends to the sieve-frames at $i$, and extend over horizontal rollers $j$, arranged near the head of each sieve, and provided preferably with annular grooves $j'$, through which the cords pass, and whereby they are held against lateral displacement.

$k$ represents vertical bars, which are guided in openings formed in cross-pieces $k'$ $k^2$, so as to be capable of vertical movement in the same. The lower ends of these side bars rest upon cams $l$, secured to a horizontal shaft, $l'$.

$m$ represents spiral springs surrounding the bars $k$, and resting with their lower ends against shoulders on the said bars, and with their upper ends against the cross-piece k', so as to hold the bars against the cams l. The cords h are made so long that they hang loosely under the sieves when the bars are in an elevated position, and that they are tightened and caused to impinge against the under sides of the sieves when the bars descend under the pressure of the springs as the abrupt sides of the cams clear the bars.

n represents a revolving brush arranged at the tail end of the lower sieve, so as to disintegrate the material escaping from the sieve and detach the fine particles from the coarse parts to which they may adhere.

c represents an endless belt or chain elevator, between the ascending and descending sides of which the inclined sieve or sieves are arranged. The buckets c' of the elevator run so closely to the bottom a' of the casing a as to pick up the material which falls on said bottom and elevate the same. The elevator belts or chains run around pulleys or sprocket-wheels o, arranged in the corners of the casing, so that the ascending and descending sides and bottom portion of the elevator are about parallel with the upright sides and bottom of the chest.

p represents depressing pulleys or wheels arranged above the elevator belts or chains, between and below the pulleys or wheels o at the top of the chest, and so that the elevator belts or chains, after passing around the upper pulley, o, on the ascending side of the elevator, will assume a downward direction, whereby the buckets are inverted and their contents discharged upon the head of the upper sieve, b.

The driving-power may be applied by means of a driving-belt running over a pulley, q, on the shaft of one of the upper pairs of sprocket-wheels, o, to drive the elevators, and the brush n may be driven by a belt, s, running around a pulley, t. The conveyers are driven by the chain-belt u and sprocket-wheels v, and may be connected with any one of the elevator-shafts or other suitable driving mechanism.

w represents openings formed in the casing for inspection and ventilation. They may be provided with a suitable slide or window.

The cams l, for actuating the lower set of reciprocating bars, k, may be placed upon the shaft of one of the lower pairs of sprocket-wheels, o, as shown in the drawings; and the cams of the upper sieves are mounted on shafts x, which are driven from the elevator belts or chains by sprocket-wheels y.

The material to be separated is delivered into the main casing or chest a, in any suitable manner, on one side thereof, and falls on the bottom of the chest, where it is picked up by the elevator and delivered upon the head of the sieve b. The fine constituent parts are bolted out in passing over the sieve or series of sieves, and the tailings, before they are discharged from the last sieve, are subjected to the disintegrating action of the revolving brush n, whereby the fine particles are detached from the coarse portions of the material. The material falls from the last sieve again upon the bottom of the chest, and is again elevated to the upper sieve and caused to flow over the series of sieves, and this operation is repeated a large number of times as the material is gradually moved from the feed side to the discharge side of the chest by the inclined chutes f. The fine material which is bolted out by each sieve is separately discharged by the screw-conveyer arranged underneath each sieve, the finest grades being discharged by the upper conveyer and the coarser grades by the lower conveyer, the sieves being graded according to the work for which they are intended.

My improved separating-machine is very simple and compact in construction and has a very large separating capacity for a given amount of separating-surface. The machine may be used for separating flour from meal; but it is equally well adapted for use as a grain-separator, and it will be understood that by varying the fineness of the sieves b the machine may be adapted to perform the separation of various materials.

I claim as my invention—

1. The combination, with an inclosing casing or chest, of an endless belt or chain elevator, adapted to elevate the material from the bottom of the chest to the upper part thereof, and an inclined sieve arranged between the ascending and descending sides of the elevator, and adapted to receive the elevated material from the elevator and to discharge the coarse material upon the bottom of the chest, substantially as set forth.

2. The combination, with the inclosing case or chest, of an endless belt or chain elevator, an inclined sieve arranged between the ascending and descending sides of the elevator, and mechanism whereby the buckets of the elevator are inverted over the head portion of the inclined sieve, substantially as set forth.

3. The combination, with the inclosing chest or casing, of an endless belt or chain elevator, c, running over pulleys or wheels o, an inclined sieve arranged between the ascending and descending sides of the elevator, and depressing-wheels p, whereby the elevator is caused to travel in a downward direction over the head portion of the sieve, substantially as set forth.

4. The combination, with the inclosing chest or casing, of an endless belt or chain elevator, an inclined sieve arranged between the ascending and descending sides of the elevator, and a rotary brush, whereby the material is disintegrated, substantially as set forth.

5. The combination, with an inclosing-chest, of an endless belt or chain elevator, two sieves, arranged one above the other, between the ascending and descending sides of the elevator and inclined in opposite directions, and a pivoted adjustable gate, g, whereby the material escaping from the upper sieve can be directed upon the lower sieve or directly into the casing at will, substantially as set forth.

6. The combination, with an inclined sieve, b, of a sliding bar, k, revolving actuating-cam l, spring m, guide-roller j, and whip-cord h, attached with its ends respectively to the sliding bar and the sieve-frame, substantially as set forth.

JOHN DAMP.

Witnesses:
H. A. L. MARKEL,
W. C. MOORE.